(12) United States Patent
Mizuguchi et al.

(10) Patent No.: US 11,919,504 B2
(45) Date of Patent: Mar. 5, 2024

(54) MOTOR CONTROL DEVICE

(71) Applicant: AISIN CORPORATION, Kariya (JP)

(72) Inventors: Hirotaka Mizuguchi, Kariya (JP); Satoshi Kokubo, Kariya (JP); Yoichi Oi, Anjo (JP); Tomoki Inagaki, Anjo (JP)

(73) Assignee: AISIN CORPORATION, Aichi (JP)

( * ) Notice: Subject to any disclaimer, the term of this patent is extended or adjusted under 35 U.S.C. 154(b) by 442 days.

(21) Appl. No.: 17/417,568

(22) PCT Filed: Dec. 13, 2019

(86) PCT No.: PCT/JP2019/049052
§ 371 (c)(1),
(2) Date: Jun. 23, 2021

(87) PCT Pub. No.: WO2020/137639
PCT Pub. Date: Jul. 2, 2020

(65) Prior Publication Data
US 2022/0055609 A1 Feb. 24, 2022

(30) Foreign Application Priority Data

Dec. 25, 2018 (JP) .................. 2018-241289

(51) Int. Cl.
*B60W 20/16* (2016.01)
*B60W 10/06* (2006.01)
*B60W 10/08* (2006.01)

(52) U.S. Cl.
CPC ............ *B60W 20/16* (2016.01); *B60W 10/06* (2013.01); *B60W 10/08* (2013.01);
(Continued)

(58) Field of Classification Search
CPC ...... B60W 10/06; B60W 10/08; B60W 20/17; B60W 40/10; B60W 2510/0685;
(Continued)

(56) References Cited

U.S. PATENT DOCUMENTS 10,808,798 B2 * 10/2020 Mizuguchi ............... B60K 6/48
11,247,659 B2 * 2/2022 Asai ....................... B60K 6/387

FOREIGN PATENT DOCUMENTS

| JP | 2013169953 A | 9/2013 |
| JP | 2017100580 A | 6/2017 |

OTHER PUBLICATIONS

International Search Report (PCT/ISA/210) and Written Opinion (PCT/ISA/237) dated Mar. 3, 2020, by the Japan Patent Office as the International Searching Authority for International Application No. PCT/JP2019/049052.

* cited by examiner

*Primary Examiner* — Andrew Joseph Rudy
(74) *Attorney, Agent, or Firm* — BUCHANAN INGERSOLL & ROONEY PC

(57) ABSTRACT

A motor control device according to an embodiment includes a hardware processor configured to: calculate a first torsion torque generated by a motor shaft according to fluctuation of an engine torque based on a difference between a motor angle as a rotation angle of the motor shaft and a shaft angle as a rotation angle of a transmission shaft of a transmission on the downstream side of a damper; calculate a first vibration damping torque to be output by a motor generator to damp vibration of the motor shaft based on the first torsion torque and a drive state value indicating a drive state of an engine; and output a motor torque command value to be provided to the motor generator based on the first vibration damping torque.

5 Claims, 6 Drawing Sheets

(52) U.S. Cl.
CPC ............... *B60W 2510/0638* (2013.01); *B60W 2510/0657* (2013.01); *B60W 2510/0685* (2013.01); *B60W 2510/083* (2013.01)

(58) Field of Classification Search
CPC .. B60K 6/387; B60K 6/48; B60K 6/54; B60L 3/00; B60L 15/2054; B60L 50/16; B60L 2240/421; B60L 2240/423; B60L 2240/443; B60L 2240/14
USPC .......................................................... 701/84
See application file for complete search history.

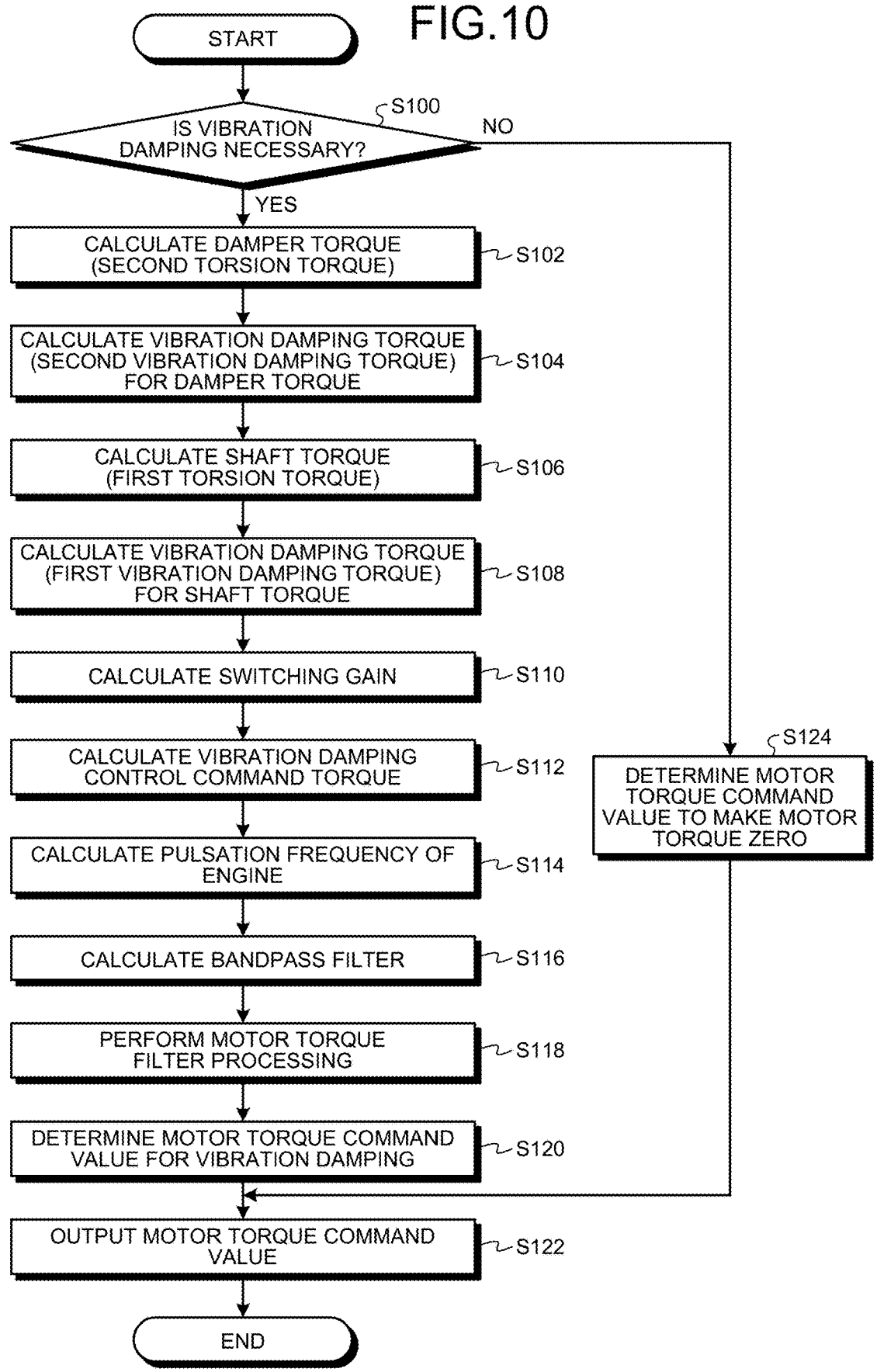

MOTOR CONTROL DEVICE

CROSS-REFERENCE TO RELATED APPLICATIONS

This application is a national stage application of International Application No. PCT/JP2019/049052, filed on Dec. 13, 2019, which designates the United States, incorporated herein by reference, and which claims the benefit of priority from Japanese Patent Application No. 2018-241289, filed on Dec. 25, 2018, the entire contents of which are incorporated herein by reference.

TECHNICAL FIELD

An embodiment described herein relates to a motor control device.

BACKGROUND ART

Conventionally, there has been known a vehicle that includes: an engine and a motor generator as power sources; a transmission that transfers to wheels a driving torque based on at least one of an engine torque of the engine and a motor torque of the motor generator at a selected change gear ratio; and a damper that reduces vibration of a crankshaft of the engine. In addition, there has been known a technology for reducing vibration generated in a drive shaft or the like in accordance with a torsion torque of the damper, by outputting a motor torque in a reverse phase to the torsion torque generated by the damper due to the vibration (torque fluctuation) of the engine to offset the torsion torque in the damper.

CITATION LIST

Patent Literature

Patent Document 1: JP 2013-169953 A

SUMMARY OF INVENTION

Problem to be Solved by the Invention

However, in a case of the vehicle as described above, the drive shaft may vibrate (resonate) due to the torsion torque generated in other than the damper. For example, the motor shaft of the motor generator transfers a torque to the drive shaft via the transmission. Therefore, a torsion torque may be generated in the motor shaft due to the vibration (torque fluctuation) of the crankshaft of the engine, the drive shaft may resonate due to the vibration caused by the torsion torque, and accordingly, severe vibration may be generated.

Therefore, one of objects of the embodiment is to provide a motor control device capable of reducing the torsion torque generated in the motor shaft of the motor generator to reduce the vibration (resonance) of the drive shaft.

Means for Solving Problem

According to an embodiment, a motor control device for a vehicle, which includes: an engine and a motor generator each serving as a power source; a transmission that transfers, to wheels, a driving torque based on at least one of an engine torque of a crankshaft of the engine and a motor torque of a motor shaft of the motor generator at a selected change gear ratio; and a damper that is provided between the engine and the transmission and reduces vibration of the crankshaft by using an elastic member, includes a hardware processor configured to: calculate a first torsion torque generated by the motor shaft according to fluctuation of the engine torque based on a difference between a motor angle as a rotation angle of the motor shaft and a shaft angle as a rotation angle of a transmission shaft of the transmission on a downstream side of the damper; calculate a first vibration damping torque to be output by the motor generator to damp vibration of the motor shaft based on the first torsion torque and a drive state value indicating a drive state of the engine; and output a motor torque command value to be provided to the motor generator based on the first vibration damping torque. With this configuration, for example, the first torsion torque that causes the vibration generated in the motor shaft can be further reduced by the first vibration damping torque, and as a result, the vibration (resonance) of the drive shaft can be reduced.

Moreover, in the motor control device according to the embodiment, the hardware processor is further configured to: calculate a second torsion torque generated by the damper according to fluctuation of the engine torque based on a difference between a crank angle as a rotation angle of the crankshaft and the shaft angle; and calculate a second vibration damping torque to be output by the motor generator to damp vibration of the damper based on the second torsion torque and the drive state value of the engine. The hardware processor may be configured to output a motor torque command value to be provided to the motor generator based on at least one of the first vibration damping torque and the second vibration damping torque according to a number of rotations of the engine. With this configuration, for example, the second torsion torque that causes the vibration generated in the damper can be reduced by the second vibration damping torque. In this case, the dominant vibration source of the vibration (resonance) in the drive shaft may be the damper or the motor shaft according to the engine state (number of rotations). Therefore, the vibration (resonance) of the drive shaft can be more effectively reduced by properly using each of the first vibration damping torque and the second vibration damping torque according to the number of rotations of engine.

Moreover, in the motor control device according to the embodiment, the hardware processor may be configured to acquire switching gains of the first vibration damping torque and the second vibration damping torque according to the number of rotations of the engine, and output the motor torque command value based on the first vibration damping torque and the motor torque command value based on the second vibration damping torque, according to the switching gains. With this configuration, it is possible to effectively reduce the resonance (vibration) of the drive shaft, which is changed according to the engine state (number of rotations), by changing the magnitude of the first vibration damping torque and the magnitude of the second vibration damping torque according to the number of rotations of engine.

Moreover, in the motor control device according to the embodiment, the drive state value may be determined based on the number of rotations of the engine and a load factor of the engine. With this configuration, for example, it is possible to perform the calculation of the vibration damping torque in which the driving state of the engine that causes the vibration (resonance) generated in the drive shaft is further reflected, and thus, the vibration (resonance) of the drive shaft can be more effectively reduced.

Moreover, in the motor control device according to the embodiment, the hardware processor may be configured to:

output the motor torque command value in a case where a clutch provided between the engine and the transmission is in a connection state in which the crankshaft and the transmission shaft are connected to each other; and output the motor torque command value that makes the motor torque zero in a case where the clutch is in a disconnection state in which the crankshaft and the transmission shaft are disconnected from each other or in a case where an acceleration operation of accelerating the vehicle is not performed when the clutch is in the connection state. With this configuration, for example, it is possible to select whether or not to generate the motor torque for reducing the influence of the vibration (resonance) of the drive shaft depending on whether or not the vibration of the crankshaft is transferred to the wheels via the clutch.

BRIEF DESCRIPTION OF DRAWINGS

FIG. 10 is an exemplary flowchart illustrating a series of processing performed by the motor control device according to the embodiment.

DESCRIPTION OF EMBODIMENTS

Hereinafter, an exemplary embodiment of the present invention will be disclosed. The configuration of the embodiment described below, and the actions, results, and effects produced by such the configuration, are examples. The present invention can be realized by a configuration other than the configuration disclosed in the following embodiment, and at least one of various effects based on the basic configuration and derivative effects can be obtained.

Figure 1:
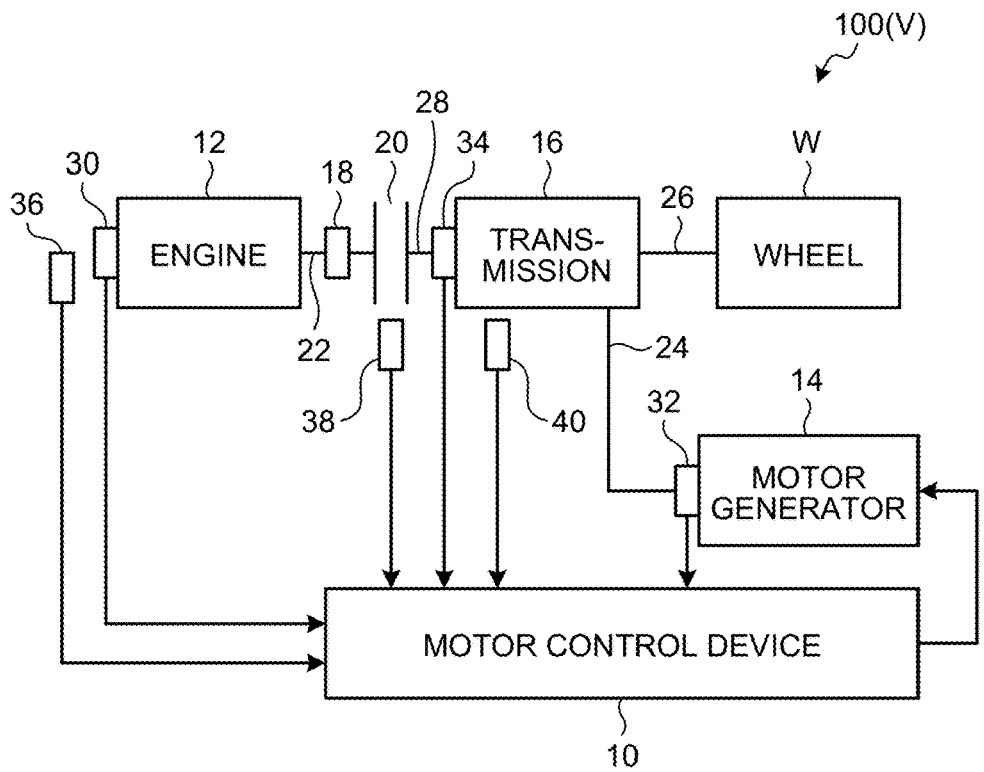
FIG. 1 is an exemplary and schematic block diagram illustrating a configuration of a drive system of a vehicle, the drive system including a motor control device according to an embodiment.

FIG. 1 is an exemplary and schematic block diagram illustrating a configuration of a drive system 100 of a vehicle V, the drive system 100 including a motor control device 10 according to an embodiment.

As illustrated in FIG. 1, the drive system 100 of the vehicle V according to the embodiment includes an engine 12, a motor generator 14, a transmission 16, a damper 18, a clutch 20, and the motor control device 10.

The engine 12 and the motor generator 14 are power sources for the vehicle V. The engine 12 outputs an engine torque under the control of an engine ECU (not illustrated) to rotate a crankshaft 22. Similarly, the motor generator 14 outputs a motor torque under the control of the motor control device 10 to rotate a motor shaft 24.

The transmission 16 transfers a driving torque based on at least one of the engine torque of the crankshaft 22 of the engine 12 or the motor torque of the motor shaft 24 of the motor generator 14 to wheels W at a selected change gear ratio. The driving torque is transferred to the wheels W via a drive shaft 26.

The damper 18 is a torque fluctuation absorbing device that reduces (absorbs) vibration (engine torque fluctuation) of the crankshaft 22. The damper 18 includes an elastic member similar to that of a general damper, and generates a damper torque according to engine torque fluctuation.

The clutch 20 is provided between the engine 12 (damper 18) and the transmission 16 and performs switching to connect or disconnect the crankshaft 22 of the engine 12 and a transmission shaft 28 of the transmission 16 to or from each other. The clutch 20 performs the transfer of (at least a part of) a torque between the crankshaft 22 and the transmission shaft 28 in a case where the clutch 20 is in a connection state in which the crankshaft 22 and the transmission shaft 28 are connected to each other. Further, the clutch 20 interrupts the transfer of the torque between the damper 18 and the transmission shaft 28 of the transmission 16 arranged on the downstream side of the damper 18 in a case where the clutch 20 is in a disconnection state in which the crankshaft 22 and the transmission shaft 28 are disconnected from each other.

The motor control device 10 is, for example, an electronic control unit (ECU) configured as a microcomputer including a processor, a memory, and the like. The motor control device 10 controls the motor torque of the motor generator 14 by supplying a motor torque command value as a command value to the motor generator 14.

The motor control device 10 can use various sensors provided in the vehicle V for control. In the example illustrated in FIG. 1, various sensors include a crank angle sensor 30, a motor angle sensor 32, a shaft angle sensor 34, an accelerator position sensor 36, a stroke sensor 38, a shift position sensor 40, and the like.

The crank angle sensor 30 detects a crank angle as a rotation angle of the crankshaft 22. The motor angle sensor 32 detects a motor angle as a rotation angle of the motor shaft 24. The shaft angle sensor 34 detects a shaft angle as a rotation angle of the transmission shaft 28 of the transmission 16.

The accelerator position sensor 36 detects the amount (depressing amount and operation position) by which an acceleration operation unit (not illustrated) for performing an acceleration operation to accelerate the vehicle V, such as an accelerator pedal, is performed or the like to detect whether or not the acceleration operation is being performed by a driver. The stroke sensor 38 detects the amount (depressing amount and operation position) by which a clutch operation unit (not illustrated) for operating the clutch 20, such as a clutch pedal, is performed or the like to detect whether the clutch 20 is in the connection state or in the disconnection state. The shift position sensor 40 detects a gear stage (shift stage) currently set in the transmission 16.

Meanwhile, in a configuration in which a general damper such as the damper 18 according to the embodiment is provided, as a torsion torque is generated in the damper 18 due to torque fluctuation (vibration) of the engine 12 (crankshaft 22), the damper 18 may vibrate. For such a case, a technology for reducing vibration by outputting a motor torque in a reverse phase to the torsion torque generated in the damper 18 to offset the torsion torque in the damper 18 has been known.

However, in a case of the drive system 100 of the vehicle V, the drive shaft 26 may vibrate (resonate) due to the torsion torque generated in other than the damper 18. For example, the motor shaft 24 of the motor generator 14 transfers a torque to the drive shaft 26 via the transmission 16. Therefore, the torsion torque may be generated in the motor shaft 24 due to the vibration (torque fluctuation) of the crankshaft 22 of the engine 12, the drive shaft may resonate due to the vibration caused by the torsion torque, and accordingly, large vibration may be generated.

Figure 2:
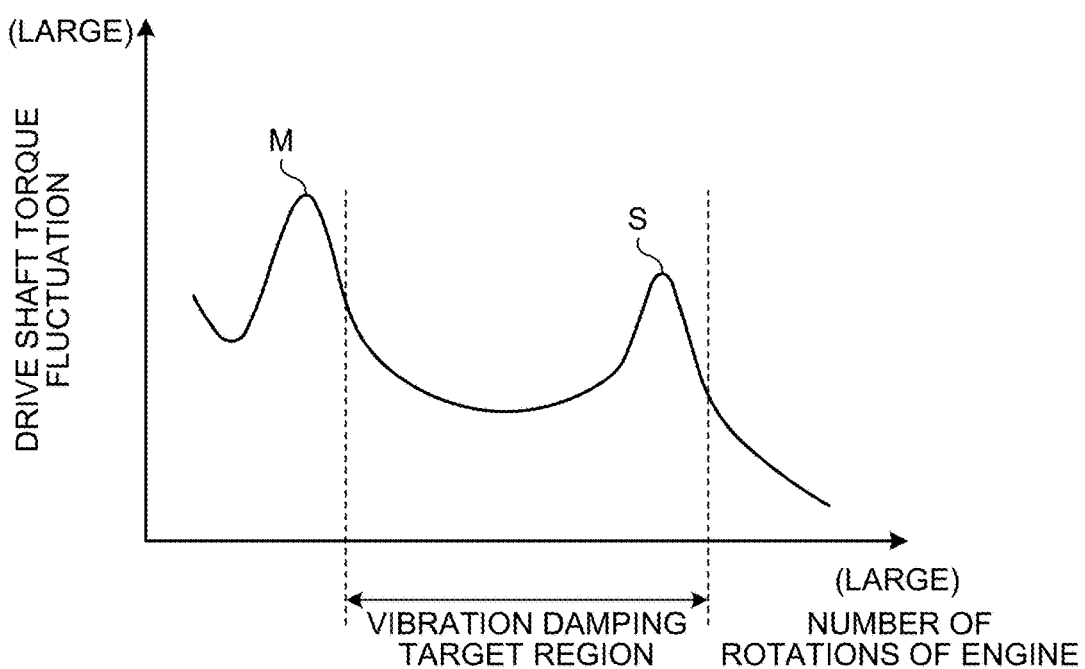
FIG. 2 is an exemplary and schematic diagram of the positions of damper resonance and motor shaft resonance that cause torque fluctuation (vibration) generated in a drive shaft, which should be considered in the embodiment.

FIG. 2 is a diagram illustrating torque fluctuation (vibration) generated in the drive shaft 26. In FIG. 2, torque fluctuation generated in a region where the number of rotations of the engine 12 is low is damper resonance M that appears in the drive shaft 26 due to the vibration caused by the torsion torque of the damper 18. Further, torque fluctuation generated in a region where the number of rotations of the engine 12 is high is shaft resonance S that appears in the drive shaft 26 due to the vibration caused by the torsion torque of the motor shaft 24. As described above, the damper resonance M mainly generated in the region where the number of rotations of the engine 12 is low can be reduced by applying the motor torque in the reverse phase to the torsion torque generated in the damper 18. That is, the torsion torque in the damper 18 can be offset to reduce the vibration in the damper 18. On the other hand, the shaft resonance S mainly generated in the region where the number of rotations of the engine 12 is high has not been considered in the related art because the vibration becomes smaller as the number of rotations of the engine 12 is increased. However, in some configurations of the drive system 100, the position of the shaft resonance S may shift to the low number-of-rotations region and enter, for example, a vibration damping target region (a region where the number of rotations of engine is commonly used in the normal traveling of the vehicle V). The position of the shaft resonance S is changed depending on various factors, for example, the configuration of the vehicle V such as the configuration of the transmission 16, rigidity, or inertia. Therefore, the present embodiment focuses on the shaft resonance S, and reduces the shaft resonance to suppress the vibration of the vehicle V, thereby improving ride quality. Specifically, the torsion torque of the motor shaft 24 is calculated, and the motor generator 14 generates a vibration damping torque for offsetting the torsion torque, thereby reducing the torque fluctuation (vibration) of the motor shaft 24 to reduce the generation of the shaft resonance S in the drive shaft 26.

Figure 3:
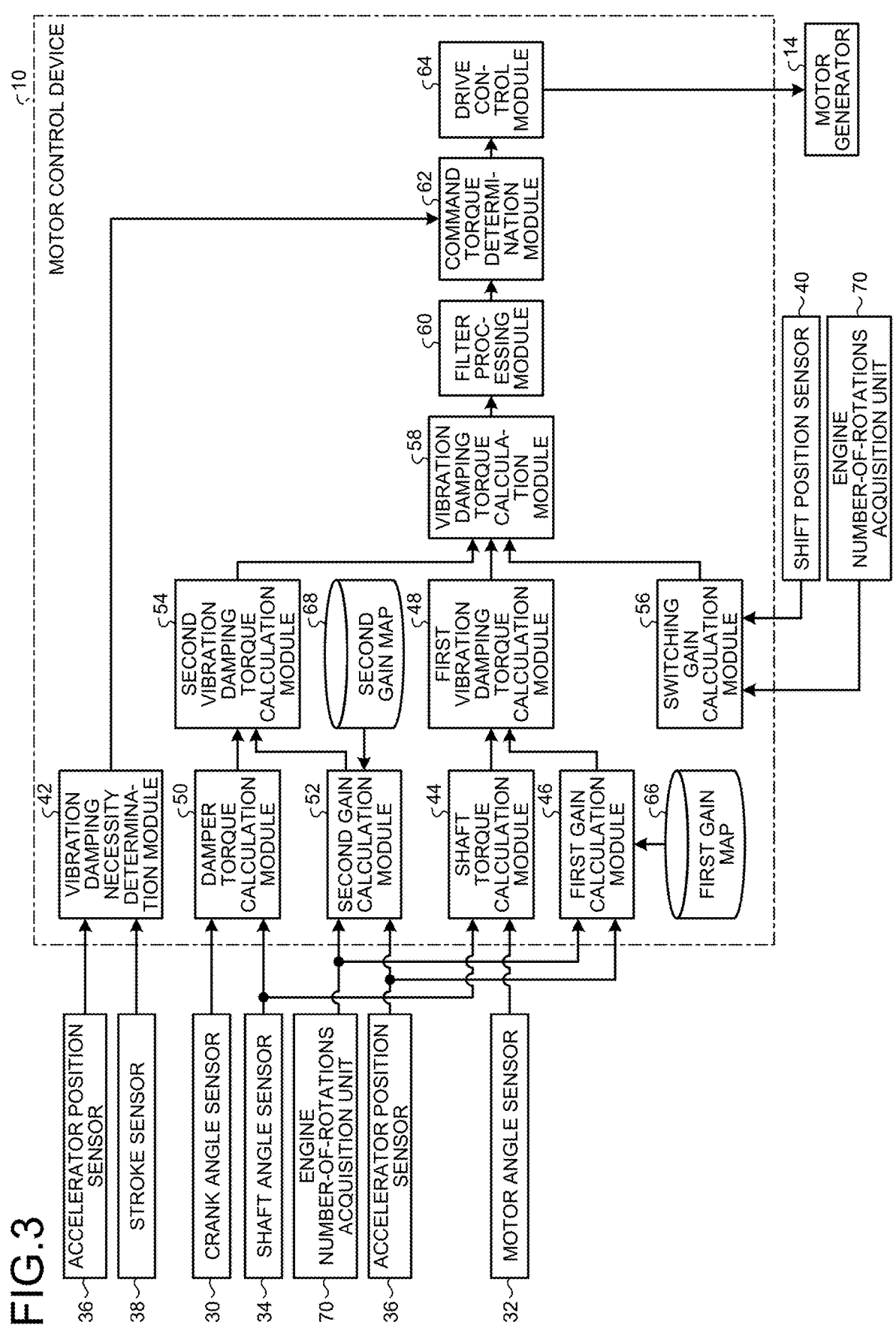
FIG. 3 is an exemplary and schematic block diagram illustrating a group of functional modules included in the motor control device according to the embodiment.

FIG. 3 is an exemplary and schematic block diagram illustrating a group of functional modules included in the motor control device 10 according to the embodiment.

As illustrated in FIG. 3, the motor control device 10 includes a vibration damping necessity determination module 42, a shaft torque calculation module 44 (also referred to as a first torque calculation module), first gain calculation module 46, a first vibration damping torque calculation module 48, a damper torque calculation module 50 (also referred to as a second torque calculation module), a second gain calculation module 52, a second vibration damping torque calculation module 54, a switching gain calculation module 56, a vibration damping torque calculation module 58, a filter processing module 60, a command torque determination module 62, a drive control module 64, and the like. In the embodiment, a part of or the entire group of the functional modules may be implemented by dedicated hardware (circuit). Note that, in the present embodiment, the switching gain calculation module 56, the vibration damping torque calculation module 58, the filter processing module 60, the command torque determination module 62, and the drive control module 64 are also collectively referred to as a "motor torque command output module".

Further, as illustrated in FIG. 3, the motor control device 10 includes a first gain map 66 as data referred to by the first gain calculation module 46. Further, the motor control device 10 includes a second gain map 68 as data referred to by the second gain calculation module 52.

The vibration damping necessity determination module 42 determines whether or not it is necessary to output the motor torque for reducing the vibration (resonance) of the drive shaft 26 by offsetting the damper torque which causes the vibration of the damper 18 and a shaft torque which causes the vibration of the motor shaft 24 based on detection results of the accelerator position sensor 36 and the stroke sensor 38. Note that, in the following description, the motor torque for reducing the vibration of the drive shaft 26 may be expressed as the vibration damping torque.

For example, in a case where the clutch 20 is in the disconnection state, or in a case where the clutch 20 is in the connection state, but the acceleration operation is not performed (the accelerator pedal is not pressed), the engine torque fluctuation is not transferred to the drive shaft 26, and thus, it is not necessary to output the vibration damping torque. Therefore, in such a case, the vibration damping necessity determination module 42 notifies the command torque determination module 62 that it is not necessary to output the vibration damping torque such that the vibration damping torque becomes zero. Note that in a case where the drive system 100 travels with the motor torque of only the motor generator 14, the engine 12 is stopped and the engine torque fluctuation is not transferred to the drive shaft 26, such that it is not necessary to output the vibration damping torque. The vibration damping necessity determination module 42 can perform the determination based on a signal from a hybrid ECU (not illustrated) or the like that collectively controls the engine 12 and the motor generator 14.

On the other hand, in a case where the clutch 20 is in the connection state and the acceleration operation is performed, the engine torque fluctuation is transferred to the drive shaft 26, and thus, it is necessary to reduce the vibration by using the vibration damping torque. Therefore, in such a case, the vibration damping necessity determination module 42 notifies the command torque determination module 62 that it is necessary to output the vibration damping torque such that the vibration damping torque for offsetting the damper torque and the shaft torque is output.

The shaft torque calculation module 44 calculates (estimates) a shaft torque Ts (first torsion torque) generated by the motor shaft 24 based on detection results of the shaft angle sensor 34 and the motor angle sensor 32. The torsion angle of the motor shaft 24 can be calculated based on a difference between a shaft angle θ1 of the transmission shaft 28 as the detection result of the shaft angle sensor 34, and a motor angle θ2 as the detection result of the motor angle sensor 32. Further, the shaft torque Ts can be calculated by Expression Ts=Ks(θ1−θ2), Ks being a spring constant of the motor shaft 24.

Figure 4:
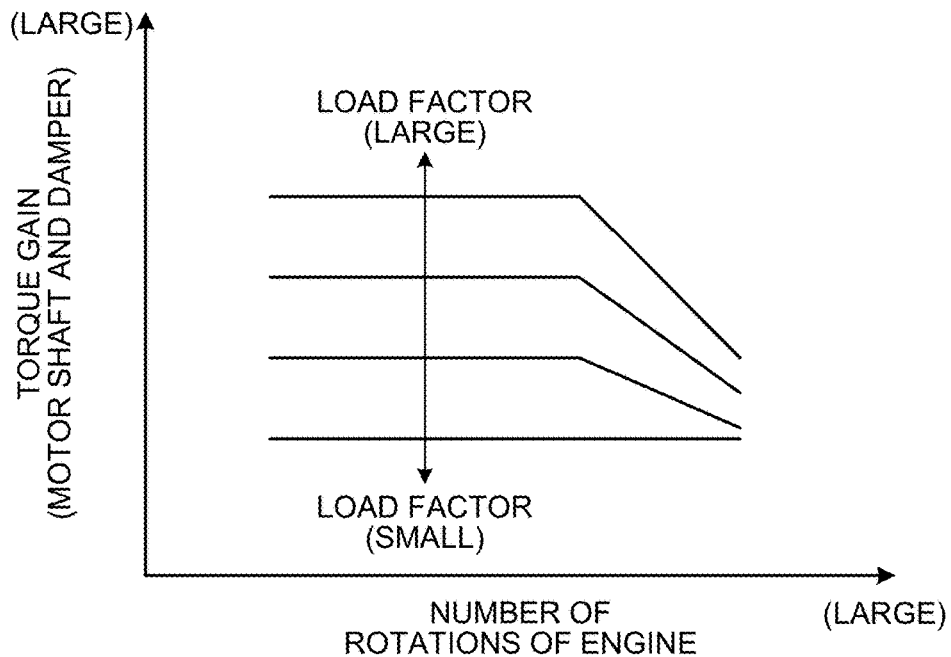
FIG. 4 is an exemplary and schematic explanatory diagram illustrating the transition of a torque gain of a vibration damping torque that is changed according to torque fluctuation (vibration) of a crankshaft that is changed according to the number of rotations of an engine and a load factor of the engine.

The first gain calculation module 46 calculates a first gain Gs (shaft torque gain) used when the first vibration damping torque calculation module 48 determines the vibration damping torque (first vibration damping torque) for the motor shaft 24. The magnitude of the vibration generated in the engine 12 (crankshaft 22) is changed according to the number of rotations of the engine 12 and the load factor of the engine 12. For example, as illustrated in FIG. 4, the larger the load factor of the engine 12, the larger the vibration of the engine 12 (crankshaft 22). As a result, the vibration (torque fluctuation) in the motor shaft 24 also becomes large, and thus, a larger damping torque is required for vibration damping. On the contrary, in a case where the load factor of the engine 12 is small, the vibration of the engine 12 (crankshaft 22) becomes small. That is, the vibration (torque fluctuation) in the motor shaft 24 also becomes small, and thus, a small vibration damping torque is required for vibration damping. As illustrated in FIG. 4, a relationship between the number of rotations and load factor of the engine 12 and the torque gain can be calculated in advance by a test or the like, and, for example, can be mapped and stored in the first gain map 66. The number of rotations of the engine 12 is acquired by an engine number-of-rotations acquisition unit 70. For example, the engine number-of-rotations acquisition unit 70 may acquire the number of rotations of the engine 12 by estimating the number of rotations of the engine 12 based on the detection result of the crank angle sensor 30, or may acquire the number of rotations by detecting the number of rotations using a dedicated sensor. Further, the engine number-of-rotations acquisition unit 70 may acquire the number of rotations of the engine 12 from the number of rotations of the motor generator 14 when the motor generator 14 and the engine 12 are connected to each other in terms of power. Further, the load factor of the engine 12 can be estimated by referring to, for example, the detection result of the accelerator position sensor 36 and a map in which the load factor acquired in advance by a test or the like and the depressing amount of the accelerator pedal (accelerator position) are associated with each other. Further, although not illustrated, the load factor of the engine 12 may be estimated based on a detection result of a throttle sensor that detects the throttle opening degree of the engine 12 or information from the engine ECU. Note that the higher the number of rotations of the engine 12, the smaller the vibration (resonance) of the drive shaft 26. Therefore, as illustrated in FIG. 4, the map may be set so that the torque gain is decreased when the number of rotations of the engine 12 exceeds a certain value, for example. Note that the torque gain can also be expressed as a drive state value indicating the drive state of the engine 12.

The first vibration damping torque calculation module 48 calculates a first vibration damping torque Tm1 based on multiplication of the shaft torque Ts calculated the shaft torque calculation module 44 and the first gain Gs (drive state value) calculated by the first gain calculation module 46 (Tm1=Ts×Gs). Note that, since the vibration damping torque in the same phase is used for the vibration damping of the motor shaft 24, the first vibration damping torque Tm1 is "+".

The damper torque calculation module 50 calculates (estimates) a damper torque Td (second torsion torque) generated by the damper 18 based on the detection results of the crank angle sensor 30 and the shaft angle sensor 34. The torsion angle of the damper 18 can be calculated based on a difference between a crank angle θ3 as the detection result of the crank angle sensor 30, and the shaft angle θ1 of the transmission shaft 28. Further, the damper torque Td can be calculated by Expression Td=Kd(θ3−θ1), Kd being a spring constant of the elastic member of the damper 18.

The second gain calculation module 52 calculates a second gain Gd (damper torque gain) used when the second vibration damping torque calculation module 54 determines the vibration damping torque (second vibration damping torque) for the damper 18. As described above, the magnitude of the vibration generated in the engine 12 (crankshaft 22) is changed according to the number of rotations of the engine 12 and the load factor of the engine 12. Therefore, as a map for the damper 18 that is similar to the map illustrated in FIG. 4 is stored in the second gain map 68, it is possible to calculate the second gain Gd according to the number of rotations of the engine 12 acquired by the engine number-of-rotations acquisition unit 70 and the load factor of the engine 12 estimated based on the detection result of the accelerator position sensor 36.

The second vibration damping torque calculation module 54 calculates a second vibration damping torque Tm2 based on multiplication of the damper torque Td calculated by the damper torque calculation module 50 and the second gain Gd (drive state value) calculated by the second gain calculation module 52 (Tm2=Td×Gd). Note that, as described above, since the vibration damping torque in the reverse phase is used for the vibration damping of the damper 18, "−" is added to the second vibration damping torque Tm2.

Figure 5:
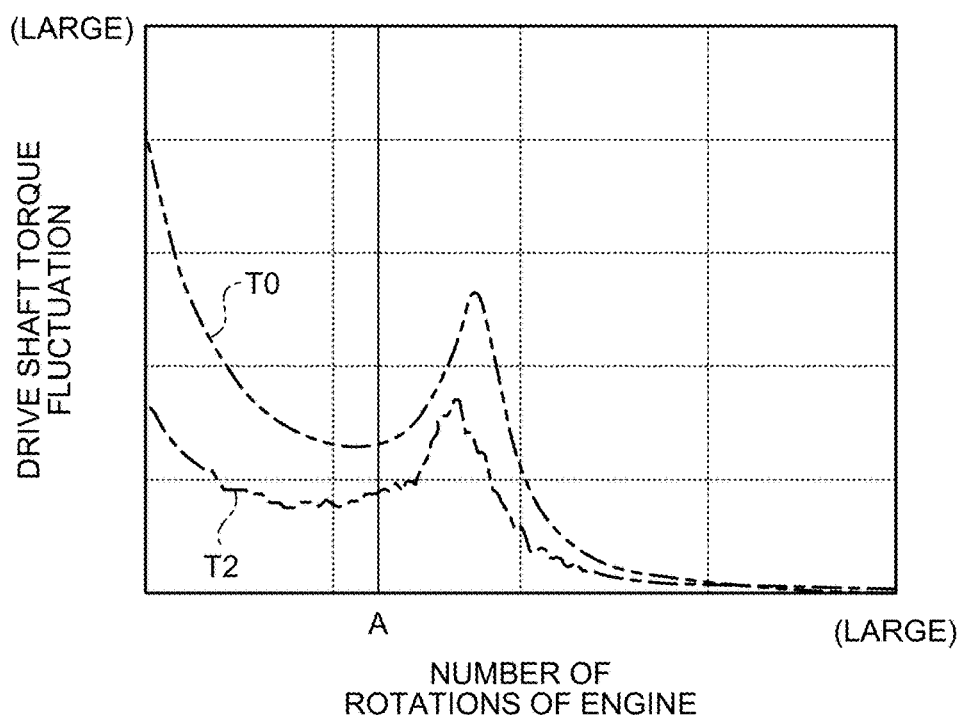
FIG. 5 is a diagram illustrating torque fluctuation (vibration) generated in the drive shaft, which exemplarily and schematically illustrates a change in torque fluctuation of the drive shaft in a case where the motor control device according to the embodiment performs a control to apply a vibration damping torque corresponding to vibration of a damper.

Meanwhile, as illustrated in FIG. 2, dominant resonance of the torque fluctuation (vibration) of the drive shaft 26 differs depending on the number of rotations of the engine 12. FIG. 5 exemplarily and schematically illustrates a change in torque fluctuation of the drive shaft 26 in a case where it is assumed that only the damper 18 vibrates, and the drive system 100 is driven and performs a control to apply the second vibration damping torque Tm2 corresponding to the damper 18 when the drive shaft 26 vibrates (resonates). Torque fluctuation T0 indicated by a line with alternating long and two short dashes is an example of torque fluctuation (uncontrolled fluctuation) in a case where the above-described second vibration damping torque Tm2 is not applied. On the other hand, torque fluctuation T2 indicated by a line with alternating long and short dashes is an example of torque fluctuation (controlled fluctuation) in a case where the above-described second vibration damping torque Tm2 is applied. As illustrated in FIG. 5, in the region where the number of rotations of the engine 12 is low (for example, the region where the number of rotations is less than A), a vibration damping effect for the vibration of the damper 18 is exhibited, such that the vibration of the drive shaft 26 is reduced. On the other hand, in the high number-of-rotations region where the number of rotations is equal to or higher than A, although the vibration of the drive shaft 26 is reduced, such reduction is not sufficient, which can cause deterioration in ride quality of the vehicle V.

Figure 6:
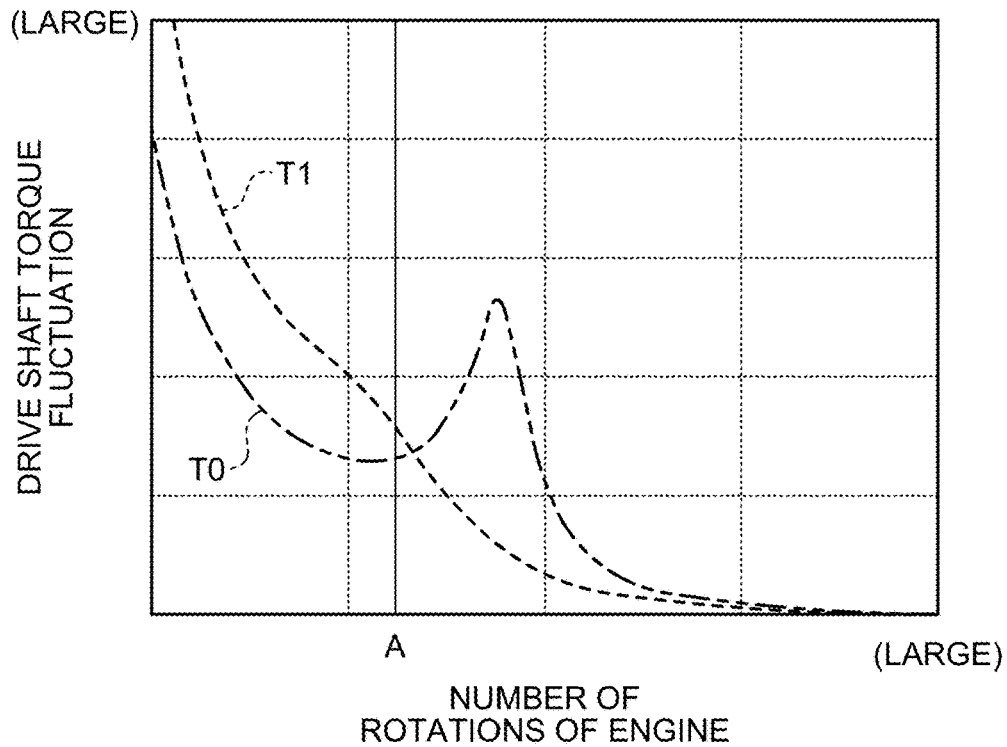
FIG. 6 is a diagram illustrating torque fluctuation (vibration) generated in the drive shaft, which exemplarily and schematically illustrates a change in torque fluctuation of the drive shaft in a case where the motor control device according to the embodiment performs a control to apply a vibration damping torque corresponding to vibration of a motor shaft.

FIG. 6 exemplarily and schematically illustrates a change in torque fluctuation of the drive shaft 26 in a case where it is assumed that only the motor shaft 24 vibrates, and the drive system 100 is driven and performs a control to apply the first vibration damping torque Tm1 corresponding to the motor shaft 24 when the drive shaft 26 vibrates (resonates). Torque fluctuation T0 indicated by a line with alternating long and two short dashes is an example of torque fluctuation (uncontrolled fluctuation) in a case where the above-described first vibration damping torque Tm1 is not applied. On the other hand, torque fluctuation T1 indicated by a broken line is an example of torque fluctuation (controlled fluctuation) in a case where the above-described first vibration damping torque Tm1 is applied. As illustrated in FIG. 6, in the region where the number of rotations of the engine 12 is high (for example, the region where the number of rotations is equal to or higher than A), a vibration damping effect for the vibration of the motor shaft 24 is exhibited, such that the vibration of the drive shaft 26 is reduced. On the other hand, in the low number-of-rotations region where the number of rotations is less than A, the vibration of the drive shaft 26 becomes severe, and the vibration becomes larger than in a case of the uncontrolled fluctuation. That is, deterioration in ride quality of the vehicle V can be caused.

Therefore, it is possible to effectively perform vibration damping over the entire range of the number of rotations of the engine 12 by switching a vibration damping target according to the number of rotations of the engine 12. Therefore, the motor control device 10 of the present embodiment includes a switching gain calculation module 56. The switching gain calculation module 56 calculates a switching gain based on, for example, the number of rotations of the engine 12 acquired by the engine number-of-rotations acquisition unit 70. For example, the switching gain calculation module 56 calculates switching gains G1 and G2 which determine whether to perform a vibration damping control corresponding to the vibration of the damper 18 or to perform a vibration damping control corresponding to the vibration of the motor shaft 24 based on shift stage information Sh acquired from the shift position sensor 40 and a number of rotations Ne of the engine 12 acquired from the engine number-of-rotations acquisition unit 70 (G1=f(Ne,Sh) and G2=f(Ne,Sh)).

Figure 7:
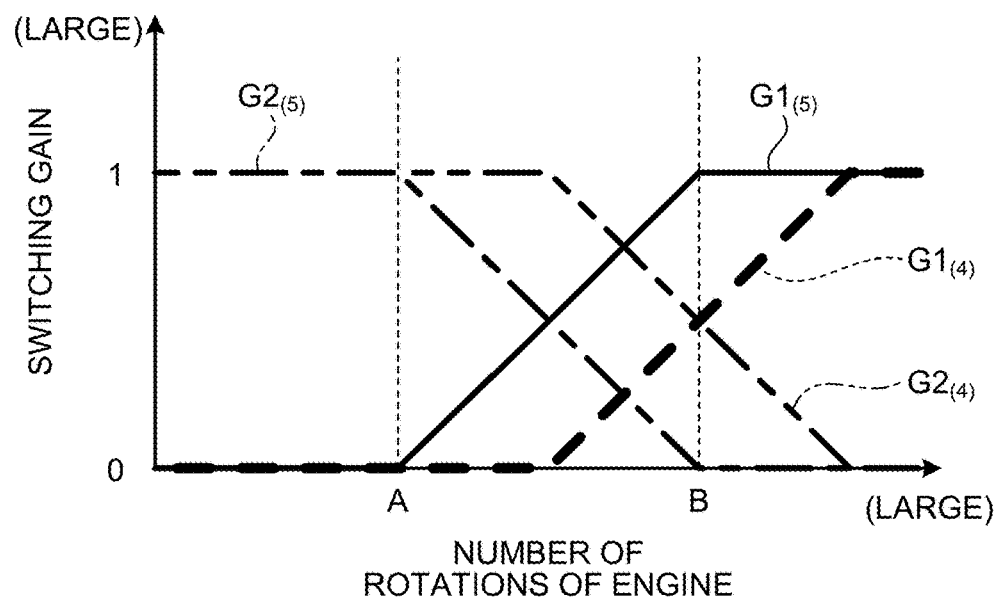
FIG. 7 is an exemplary and schematic explanatory diagram illustrating a relationship between the number of rotations of engine and a switching gain for each shift stage in a case where switching between a control using the vibration damping torque corresponding to the vibration of the damper and a control using the vibration damping torque corresponding to the vibration of the motor shaft is performed in the motor control device according to the embodiment.

FIG. 7 is an exemplary and schematic explanatory diagram illustrating a relationship between the number of rotations of engine and the switching gain for each shift stage in a case where switching between a control using the vibration damping torque corresponding to the vibration of the damper 18 and a control using the vibration damping torque corresponding to the vibration of the motor shaft 24 is performed in the motor control device 10. FIG. 7 is a diagram illustrating, for example, a switching pattern when the shift stage of the transmission 16 is "5th". In FIG. 7, a switching gain $G2_{(5)}$ indicated by a line with alternating long and short dashes is set to "1" such that the vibration damping control corresponding to the vibration of the damper 18 is performed at the maximum level in the region where the number of rotations of the engine 12 is low. On the other hand, in this case, a switching gain $G1_{(5)}$ indicated by a solid line is set to "0" such that the vibration damping control corresponding to the vibration of the motor shaft 24 is not performed. Further, when the shift stage is "5th" and the number of rotations A of the engine 12 determined in advance by a test or the like is reached, the switching gain $G2_{(5)}$ for the vibration damping control for the damper 18 is gradually decreased. In addition, the switching gain $G1_{(5)}$ for the vibration damping control for the motor shaft 24 is gradually increased. Further, when the shift stage is "5th" and a number of rotations B of the engine 12 determined in advance by a test or the like is reached, complete switching from the switching gain $G2_{(5)}$ for the vibration damping control for the damper 18 to the switching gain $G1_{(5)}$ for the vibration damping control for the motor shaft 24 is performed.

Returning to FIG. 3, the vibration damping torque calculation module 58 calculates a torque command value Tm according to the number of rotations of the engine 12 based on the first vibration damping torque Tm1 (the vibration damping torque for the motor shaft 24) calculated by the first vibration damping torque calculation module 48, the second vibration damping torque Tm2 (the vibration damping torque for the damper 18) calculated by the second vibration damping torque calculation module 54, and the switching gains G1 and G2 calculated by the switching gain calculation module 56. That is, the torque command value Tm can be calculated by Expression Tm=Tm1×G1+Tm2×G2.

The filter processing module 60 performs filtering processing on the calculation result of the vibration damping torque calculation module 58, and extracts a vibration component corresponding to a pulsation frequency of the explosion of the engine 12. The filter processing module 60 first calculates a pulsation frequency fe of the engine 12. The pulsation frequency fe can be calculated by Expression fe=Ne×n/60×c based on the number of rotations Ne of the engine 12 that can be acquired by the engine number-of-rotations acquisition unit 70 and the like, the number n of cylinders of the engine 12, and the number c of cycles of the engine 12. Since the number n of cylinders and the number c of cycles are fixed values with respect to the engine 12, the pulsation frequency fe is changed according to the number of rotations. The filter processing module 60 calculates a bandpass filter F(s) that passes the pulsation frequency fe according to the current number of rotations of the engine 12. Further, the filter processing module 60 applies the calculated bandpass filter F(s) to the torque command value Tm calculated by the vibration damping torque calculation module 58, and performs processing for upper and lower limits determined according to the performance of the motor generator 14 or target vibration damping performance. That is, an actual torque command value $Tm_{\_bpf}$ ($Tm_{\_bpf}$=F(s)×Tm) suitable for the motor generator 14 is determined.

The command torque determination module 62 outputs a motor torque command value $Tm_{\_req}$ to the drive control module 64 based on a determination result of the vibration damping necessity determination module 42. That is, in a case where it is determined that it is necessary to reduce the vibration (resonance) based on the result of determination of whether or not it is necessary to output the motor torque for reducing the vibration (resonance) of the drive shaft 26, the command torque determination module 62 outputs the motor torque command value $Tm_{\_req}$ to the drive control module 64 based on the actual torque command value $Tm_{\_bpf}$ obtained as a result of passing through the filter processing module 60. Therefore, the command torque determination module 62 outputs the motor torque command value $Tm_{\_req}$ that causes the motor generator 14 to be operated within the performance range at an appropriate timing. Then, the drive control module 64 drives the motor generator 14 according to the motor torque command value $Tm_{\_req}$.

Figure 8:
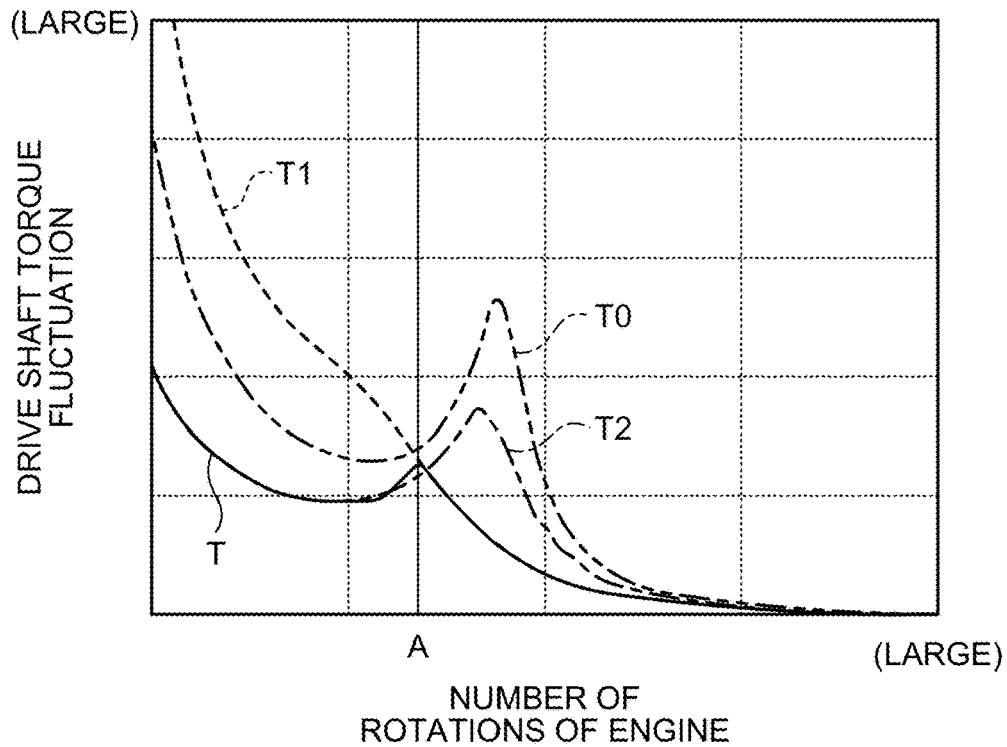
FIG. 8 is an exemplary and schematic explanatory diagram illustrating the torque fluctuation of the drive shaft in a case where a vibration damping torque switching control is performed using the switching gain of FIG. 7.

In FIG. 8, the torque fluctuation T0 of the drive shaft 26 in a case where the vibration damping control is not performed is indicated by a line with alternating long and two short dashes, the torque fluctuation T1 of the drive shaft 26 in a case where the vibration damping control for only the motor shaft 24 is performed is indicated by a broken line, and the torque fluctuation T2 of the drive shaft 26 in a case where the vibration damping control for only the damper 18 is performed is indicated by a line with alternating long and short dashes. Further, torque fluctuation T of the drive shaft 26 in a case where the switching control according to the switching gain of the switching gain calculation module 56 is performed is indicated by a solid line. As illustrated in FIG. 8, in the vibration damping control, by causing the motor generator 14 to generate a vibration damping control torque according to the motor torque command value $Tm_{\_req}$ determined by performing the switching control, the vibration damping control corresponding to the vibration of the damper 18 becomes dominant in the region where the number of rotations of the engine 12 is less than A. As a result, the vibration (resonance) of the drive shaft 26 can be reduced in the region where the number of rotations is less than A. Further, in the region where the number of rotations of the engine 12 is equal to or higher than A, the vibration damping control corresponding to the vibration of the motor shaft 24 becomes dominant. As a result, the vibration (resonance) of the drive shaft 26 can be reduced in the region where the number of rotations is equal to or higher than A. That is, in the entire range of the number of rotations of the engine 12, the vibration (resonance) of the drive shaft 26 can become smaller as compared with a case where the vibration damping control is not performed.

A timing for switching between the first vibration damping torque Tm1 and the second vibration damping torque Tm2 using the switching gains G1 and G2 (for example, a timing of the number of rotations A in FIG. 7) can be set in advance to a timing at which the feature of the vibration (resonance) of the drive shaft 26 is switched. The position of the vibration (resonance) of the drive shaft 26 can be calculated in advance according to a vehicle model or the configuration of the drive system 100 such as the engine 12 or the motor generator 14. For example, the damper resonance M caused by the vibration of the damper 18 can be calculated. Similarly, the shaft resonance S caused by the vibration of the motor shaft 24 can be calculated. Therefore, in the vibration of the drive shaft 26, the position of a "node" at which a region where the damper resonance M is dominant and a region where the shaft resonance S is dominant is switched can be specified. In a case where the first vibration damping torque Tm1 and the second vibration damping torque Tm2 are switched at the position of the "node" (for example, the position of the number of rotations A in FIG. 7), the vibration damping control that enables effective vibration damping using the first vibration damping torque Tm1 and the second vibration damping torque Tm2 can be implemented.

Note that a resonance point of the drive shaft 26 (a point of resonance caused by the vibration of the damper 18 and a point of resonance caused by the vibration of the motor shaft 24) is changed depending on the rigidity of the drive shaft 26 or the inertia acting on the drive shaft 26. For example, when the transmission 16 shifts down, the inertia affecting the drive shaft 26 is changed. Further, when the transmission 16 shifts down, the number of rotations of the engine 12 is increased, and the position of the resonance point also moves to the high rotation speed side accordingly. Therefore, the timing for switching between the first vibration damping torque Tm1 and the second vibration damping torque Tm2 using the switching gains G1 and G2 may be changed according to the shift stage of the transmission 16. For example, when the shift stage shifts down from "5th" to "4th", the switching timing shifts to the high rotation speed side as illustrated in FIG. 7, and as a result, switching to a switching gain $G2_{(4)}$ for the vibration damping control for the damper 18 indicated by a line with alternating long and two short dashes, and a switching gain $G1_{(4)}$ for the vibration damping control for the motor shaft 24 indicated by a bold broken line is made. On the contrary, when the shift stage is "6th", the switching timing shifts to the low rotation speed side. It is possible to perform a more efficient vibration damping control according to the drive state of the drive system 100 by performing switching between the vibration damping control corresponding to the vibration of the damper 18 and the vibration damping control corresponding to the vibration of the motor shaft 24 according to the shift stage of the transmission 16 as described above.

Figure 9:
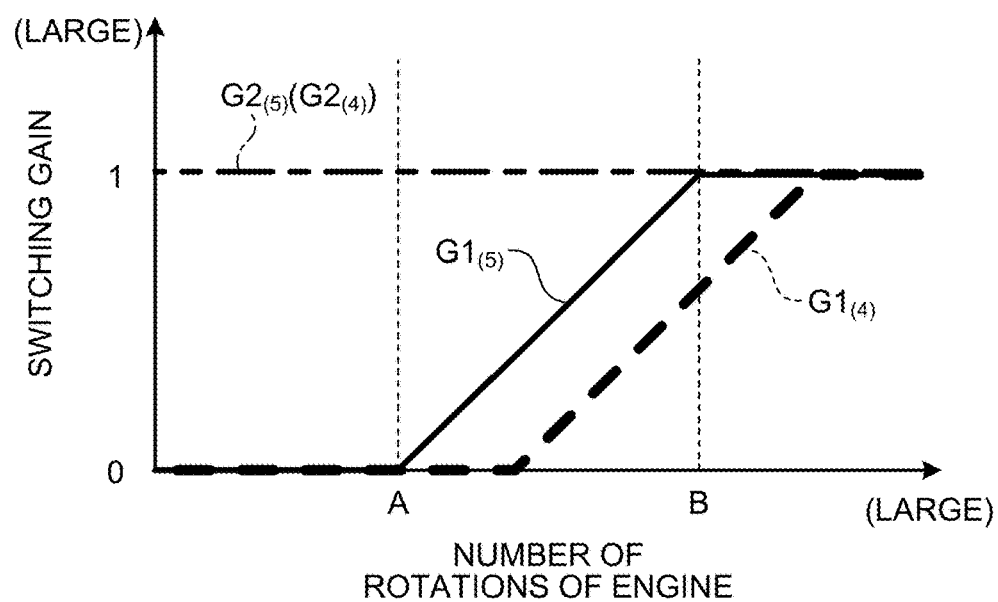
FIG. 9 is an exemplary and schematic explanatory diagram illustrating another relationship between the number of rotations of engine and the switching gain for each shift stage in a case where the switching between the control using the vibration damping torque corresponding to the vibration of the damper and the control using the vibration damping torque corresponding to the vibration of the motor shaft is performed in the motor control device according to the embodiment.

FIG. 9 is an exemplary and schematic explanatory diagram illustrating another relationship between the number of rotations of engine and the switching gain for each shift stage in a case where switching between the control using the vibration damping torque corresponding to the vibration of the damper 18 and the control using the vibration damping torque corresponding to the vibration of the motor shaft 24 is performed in the motor control device 10. As illustrated in FIGS. 5 and 8, the vibration damping control corresponding to the vibration of the damper 18 contributes to the reduction of the vibration (resonance) of the drive shaft 26 even in the region where the number of rotations of the engine 12 is high (for example, the region where the number of rotations is equal to or higher than A). Therefore, in the switching pattern of the switching gain in FIG. 9, regardless of the shift stage of the transmission 16 (for example, regardless of whether the shift stage is 5th or 4th), the switching gain $G2_{(5)}$ is set to "1" such that the vibration damping control corresponding to the vibration of the damper 18 is performed at the maximum level over the entire range of the number of rotations of the engine 12. Further, for example, when the shift stage is "5th" and the number of rotations A of the engine 12 determined in advance by a test or the like is reached, the switching gain $G1_{(5)}$ for the vibration damping control for the motor shaft 24 indicated by a solid line is gradually increased. As a result, in the region where the number of rotations is equal to or higher than A, a vibration damping effect corresponding to the vibration of the motor shaft 24 is added, and the vibration (resonance) of the drive shaft 26 can be more effectively reduced. Further, in this case, the switching gain $G2_{(5)}$ when the vibration damping control corresponding to the vibration of the damper 18 is performed is constant, such that the control is simplified. Note that, also in the switching pattern in FIG. 9, for example, when the shift stage shifts down from "5th" to "4th", the switching timing shifts to the high rotation speed side as illustrated in FIG. 9, and as a result, switching to the switching gain $G1_{(4)}$ for the vibration damping control for the motor shaft 24 indicated by a bold broken line is made. On the contrary, when the shift stage is "6th", the switching timing shifts to the low rotation speed side. Even in a case of using the switching gains G1 and G2 as illustrated in FIG. 9, as in the example illustrated in FIG. 8, in the entire range of the number of rotations of the engine 12, the vibration (resonance) of the drive shaft 26 can become smaller as compared with a case where the vibration damping control is not performed.

An example of a flow of a series of processing performed by the motor control device 10 configured as described above will be described with reference to the flowchart illustrated in FIG. 10. Note that it is assumed that the processing of the flowchart of FIG. 10 is repeatedly executed in a predetermined processing cycle.

As illustrated in FIG. 10, the vibration damping necessity determination module 42 of the motor control device 10 determines whether or not the vibration damping using the vibration damping torque is necessary. As described above, the determination is made based on the detection result of the accelerator position sensor 36 and the detection result of the stroke sensor 38 (S100).

In a case where it is determined in S100 that the vibration damping is necessary (Yes in S100), the damper torque calculation module 50 calculates the damper torque Td (Td=Kd(θ3−θ1)) based on the detection result of the crank angle sensor 30 (crank angle θ3), the detection result of the shaft angle sensor 34 (shaft angle θ1), and the spring constant Kd of the elastic member of the damper 18 (S102). Then, the second vibration damping torque calculation module 54 calculates the second vibration damping torque Tm2 (Tm2=−Td×Gd) for damping the vibration of the damper 18 based on the damper torque Td calculated by the damper torque calculation module 50, and the second gain Gd calculated by the second gain calculation module 52 by referring to the number of rotations of engine and load factor and the second gain map 68 (S104).

Further, the shaft torque calculation module 44 calculates the shaft torque Ts (Ts=Ks(θ1−θ2)) based on the detection result of the shaft angle sensor 34 (shaft angle θ1), the detection result of the motor angle sensor 32 (motor angle θ2), and the spring constant Ks of the motor shaft 24 (S106). Then, the first vibration damping torque calculation module 48 calculates the first vibration damping torque Tm1 (Tm1=Ts×Gs) for damping the vibration of the motor shaft 24 based on the shaft torque Ts calculated by the shaft torque calculation module 44, and the first gain Gs calculated by the first gain calculation module 46 by referring to the number of rotations of engine and load factor and the first gain map 66 (S108).

Further, the switching gain calculation module 56 calculates the switching gain G1 (G1=f(Ne,Sh)) and the switching gain G2 (G2=f(Ne,Sh)) based on the shift stage information Sh acquired from the shift position sensor 40 and the number of rotations Ne of the engine 12 acquired from the engine number-of-rotations acquisition unit 70 (S110). As described above, the switching gains G1 and G2 determine whether to perform the vibration damping control corresponding to the vibration of the damper 18 or to perform the vibration damping control corresponding to the vibration of the motor shaft 24.

The vibration damping torque calculation module 58 calculates the torque command value Tm (Tm=Tm1×G1+Tm2×G2) according to the number of rotations of the engine 12 based on the first vibration damping torque Tm1 calculated by the first vibration damping torque calculation module 48, the second vibration damping torque Tm2 calculated by the second vibration damping torque calculation module 54, and the switching gains G1 and G2 calculated by the switching gain calculation module 56 (S112).

Then, the filter processing module 60 calculates the pulsation frequency fe (fe=Ne×n/60×c) of the engine 12 based on the number of rotations Ne of the engine 12 that can be acquired by the engine number-of-rotations acquisition unit 70, the number n of cylinders of the engine 12, and the number c of cycles of the engine 12 (S114). Further, the filter processing module 60 calculates the bandpass filter F(s) that passes the pulsation frequency fe according to the current number of rotations of the engine 12 (S116). Then, the filter processing module 60 performs motor torque filter processing to apply the calculated bandpass filter F(s) to the torque command value Tm calculated by the vibration damping torque calculation module 58 (S118). That is, the processing for the upper and lower limits determined according to the performance of the motor generator 14 or the target vibration damping performance is performed, and the actual torque command value $Tm_{bpf}$ ($Tm_{bpf}$=F(s)×Tm) suitable for the motor generator 14 is determined.

The command torque determination module 62 determines the motor torque command value $Tm_{req}$ based on the actual torque command value $Tm_{bpf}$ obtained as a result of passing through the filter processing module 60 (S120). Then, the drive control module 64 outputs a control signal according to the motor torque command value $Tm_{req}$ to the motor generator 14 (S122), performs the vibration damping control for the motor generator 14, temporarily terminates this flow, and then repeatedly performs the processing from S100 in the next control period. As a result, as indicated by a solid line in FIG. 8, the torque fluctuation T of the drive shaft 26 can be reduced.

Note that, in S100, it is determined that the vibration damping is not necessary (No in S100), for example, when the accelerator pedal operated by the driver is not depressed or when the clutch pedal is depressed and the clutch 20 is in the disconnection state. In this case, the command torque determination module 62 determines the motor torque command value $Tm_{req}$ that makes the motor torque zero (S124). Then, the processing proceeds to S122, and the drive control module 64 outputs, to the motor generator 14, a control signal according to the motor torque command value $Tm_{req}$ that makes the motor torque zero to temporarily terminate this flow.

Note that the block diagram of the drive system 100 illustrated in FIG. 1, the group of the functional modules included in the motor control device 10 illustrated in FIG. 3, and the flowchart illustrated in FIG. 10 are examples, and can be changed as appropriate as long as the same functions can be implemented, and the same effect can be obtained.

Hereinabove, although some embodiments of the present disclosure have been described, the above-described embodiments are only examples and do not intend to limit the scope of the present invention. The novel embodiments described above can be implemented in various forms, and various omissions, replacements, and changes can be made without departing from the spirit of the present invention. The above-described embodiments and modifications thereof are included in the scope and gist of the present invention, and are also included is the inventions described in the claims and equivalents thereof.

The invention claimed is:

1. A motor control device for a vehicle including: an engine and a motor generator each serving as a power source; a transmission that transfers, to wheels, a driving torque based on at least one of an engine torque of a crankshaft of the engine and a motor torque of a motor shaft of the motor generator at a selected change gear ratio; and a damper that is provided between the engine and the transmission and reduces vibration of the crankshaft by using an elastic member, the motor control device comprising a hardware processor configured to:

calculate a first torsion torque generated by the motor shaft according to fluctuation of the engine torque based on a difference between a motor angle as a rotation angle of the motor shaft and a shaft angle as a rotation angle of a transmission shaft of the transmission on a downstream side of the damper;

calculate a first vibration damping torque to be output by the motor generator to damp vibration of the motor shaft based on the first torsion torque and a drive state value indicating a drive state of the engine; and output a motor torque command value to be provided to the motor generator based on the first vibration damping torque.

2. The motor control device according to claim 1, wherein the hardware processor is further configured to:

calculate a second torsion torque generated by the damper according to fluctuation of the engine torque based on a difference between a crank angle as a rotation angle of the crankshaft and the shaft angle; and calculate a second vibration damping torque to be output by the motor generator to damp vibration of the damper based on the second torsion torque and the drive state value of the engine, wherein the hardware processor is configured to output the motor torque command value to be provided to the motor generator based on at least one of the first vibration damping torque and the second vibration damping torque according to a number of rotations of the engine.

3. The motor control device according to claim 2, wherein the hardware processor is configured to acquire switching gains of the first vibration damping torque and the second vibration damping torque according to the number of rotations of the engine, and output the motor torque command value based on the first vibration damping torque and the motor torque command value based on the second vibration damping torque, according to the switching gains.

4. The motor control device according to claim 1, wherein the drive state value is determined based on the number of rotations of the engine and a load factor of the engine.

5. The motor control device according to claim 1, wherein the hardware processor is configured to: output the motor torque command value in a case where a clutch provided between the engine and the transmission is in a connection state in which the crankshaft and the transmission shaft are connected to each other; and output the motor torque command value that makes the motor torque zero in a case where the clutch is in a disconnection state in which the crankshaft and the transmission shaft are disconnected from each other or in a case where an acceleration operation of accelerating the vehicle is not performed when the clutch is in the connection state.

* * * * *